(12) United States Patent
Gunnerman

(10) Patent No.: US 7,559,241 B2
(45) Date of Patent: Jul. 14, 2009

(54) HIGH-THROUGHPUT CONTINUOUS-FLOW ULTRASOUND REACTOR

(75) Inventor: Rudolf W. Gunnerman, Reno, NV (US)

(73) Assignee: SulphCo, Inc., Houston, TX (US)

( * ) Notice: Subject to any disclaimer, the term of this patent is extended or adjusted under 35 U.S.C. 154(b) by 1103 days.

(21) Appl. No.: 10/857,444

(22) Filed: May 27, 2004

(65) Prior Publication Data

US 2005/0274600 A1    Dec. 15, 2005

(51) Int. Cl.
*G01N 29/34* (2006.01)
*H01L 41/06* (2006.01)
*H01L 41/12* (2006.01)
*H02N 2/00* (2006.01)

(52) U.S. Cl. .................. 73/643; 310/26; 310/316.01; 318/118

(58) Field of Classification Search .............. 604/19–22; 606/169; 73/643, 649; 156/580.1, 580.2; 318/118, 114, 126–128; 310/26, 316
See application file for complete search history.

(56) References Cited

U.S. PATENT DOCUMENTS

| | | | |
|---|---|---|---|
| 2,949,900 A | * | 8/1960 | Bodine ................. 123/472 |
| 4,920,954 A | | 5/1990 | Alliger et al. |
| 5,269,297 A | | 12/1993 | Weng et al. |
| 6,234,990 B1 | * | 5/2001 | Rowe et al. .............. 604/22 |
| 6,402,939 B1 | | 6/2002 | Yen et al. |
| 6,500,219 B1 | | 12/2002 | Gunnerman |
| 6,623,444 B2 | * | 9/2003 | Babaev ................... 604/22 |
| 6,652,992 B1 | | 11/2003 | Gunnerman |
| 2003/0051988 A1 | | 3/2003 | Gunnerman et al. |
| 2004/0079680 A1 | | 4/2004 | Gunnerman |

* cited by examiner

*Primary Examiner*—Manuel A Mendez
(74) *Attorney, Agent, or Firm*—Townsend and Townsend and Crew LLP.; Henry Heines

(57) ABSTRACT

Liquids are treated by ultrasound in a flow-through reaction vessel with an elongate ultrasonic horn mounted to the vessel with one end of the horn extending into the vessel interior. The liquid flow path inside the vessel is such that the entering liquid strikes the end of the horn at a direction normal to the end, then flows across the surface of the end before leaving the vessel. The end surface of the horn is positioned in close proximity to the entry port to provide a relatively high surface-to-volume ratio in the immediate vicinity of the horn end. In a further improvement, the horn is joined to an ultrasonic transducer through a booster block that provides an acoustic gain to the ultrasonic vibrations, and the booster block is plated with a reflective metal to lessen any loss of ultrasonic energy being transmitted to the horn.

33 Claims, 1 Drawing Sheet

HIGH-THROUGHPUT CONTINUOUS-FLOW ULTRASOUND REACTOR

BACKGROUND OF THE INVENTION

1. Field of the Invention

This invention resides in the field of process equipment used in the treatment of materials in liquid media by ultrasound, and also in the processing of petroleum and petroleum-based fuels.

2. Description of the Prior Art

The use of ultrasound for driving chemical reactions is well known. Descriptions are found in Suslick, K. S., *Science* 247: 1439 (1990), and Mason, T. J., *Practical Sonochemistry, A User's Guide to Applications in Chemistry and Chemical Engineering*, Ellis Norwood Publishers, West Sussex, England (1991). A variety of ultrasound systems have been described, and among the most prominent are "probe"-type systems, which include an ultrasonic transducer that generates ultrasonic energy and transmits that energy to a probe, i.e., an ultrasonic horn, for amplification.

Uses of ultrasound have recently been extended to include petroleum processing, notably for the desulfurization of fossil fuels and the conversion of high molecular weight components of petroleum to lower molecular weight products, thereby improving the conversion of crude oil, and particularly of crude oil resids, to useful materials. Disclosures of these processes and the equipment in which they are performed are found in Yen, T. F., et al., U.S. Pat. No. 6,402,939, issued Jun. 11, 2002, Gunnerman, R. W., U.S. Pat. No. 6,500,219, issued Dec. 31, 2002, Gunnerman, R. W., U.S. Pat. No. 6,652,992, issued Nov. 25, 2003, Gunnerman, R. W., et al., United States Pre-Grant Patent Application Publication No. US 2003-0051988 A1, published Mar. 20, 2003, Gunnerman, R. W., United States Pre-Grant Patent Application Publication No. US 2004-0079680 A1, published Apr. 29, 2004, Gunnerman, R. W., et al., U.S. patent application Ser. No. 10/440,445, filed May 16, 2003, and Gunnerman, R. W., et al., U.S. patent application Ser. No. 10/803,802, filed Mar. 17, 2004. The contents of each of the documents cited in this paragraph and elsewhere throughout this specification are hereby incorporated herein by reference in their entirety for all legal purposes capable of being served thereby.

Ultrasound processing offers a vast potential for the petroleum industry, but its value is highly sensitive to processing costs, and particularly the energy consumption involved in generating the ultrasonic vibrations. The present invention offers improvements in ultrasound processing equipment that provide a more efficient use of energy, enabling the processing of particularly large quantities of material in a highly economic manner.

SUMMARY OF THE INVENTION

It has now been discovered that ultrasound treatment can be applied to a fluid material on a continuous-flow basis with a highly efficient use of energy by incorporating certain structural improvements in the reaction vessel and the ultrasound components.

In one of these improvements, a reaction vessel is constructed with an elongate ultrasonic horn mounted to the vessel such that one end of the horn extends into the vessel interior, with a power source and an ultrasonic transducer operatively connected to an opposing end of the horn. Upon its entry into the vessel, the fluid material directly strikes the distal end of the horn, i.e., the end opposite the end to which the power source and transducer are connected, at a direction substantially normal to the distal end, then flows over the surface of the distal end before leaving the vessel through one or more exit ports in the vessel wall. The portion of the reaction vessel interior that the flowing fluid occupies as it contacts the distal end of the ultrasonic horn is restricted by placing the distal end close to the entry port, with a relatively high surface-to-volume ratio, referring to the distal end surface and the portion of the vessel volume that the fluid flows through while in contact with the distal end.

In a further improvement, the ultrasonic vibrations are produced by an electrical power source and an ultrasonic transducer, the transducer joined to the horn through a vibration transmitting block or booster, and either the block, the horn, or both are clad with a material that reflects the ultrasonic vibrations. The cladding retains vibrational energy within the block that would otherwise escape from lateral surfaces of the block that are not operatively connected to the horn. This reduction of energy loss through the lateral surfaces of the block causes a greater proportion of the vibrational energy from the transducer to be transmitted to the horn.

Further improvements, features, and embodiments of the invention will be apparent from the description that follows.

DETAILED DESCRIPTION OF THE INVENTION AND PREFERRED EMBODIMENTS

Figure 1:
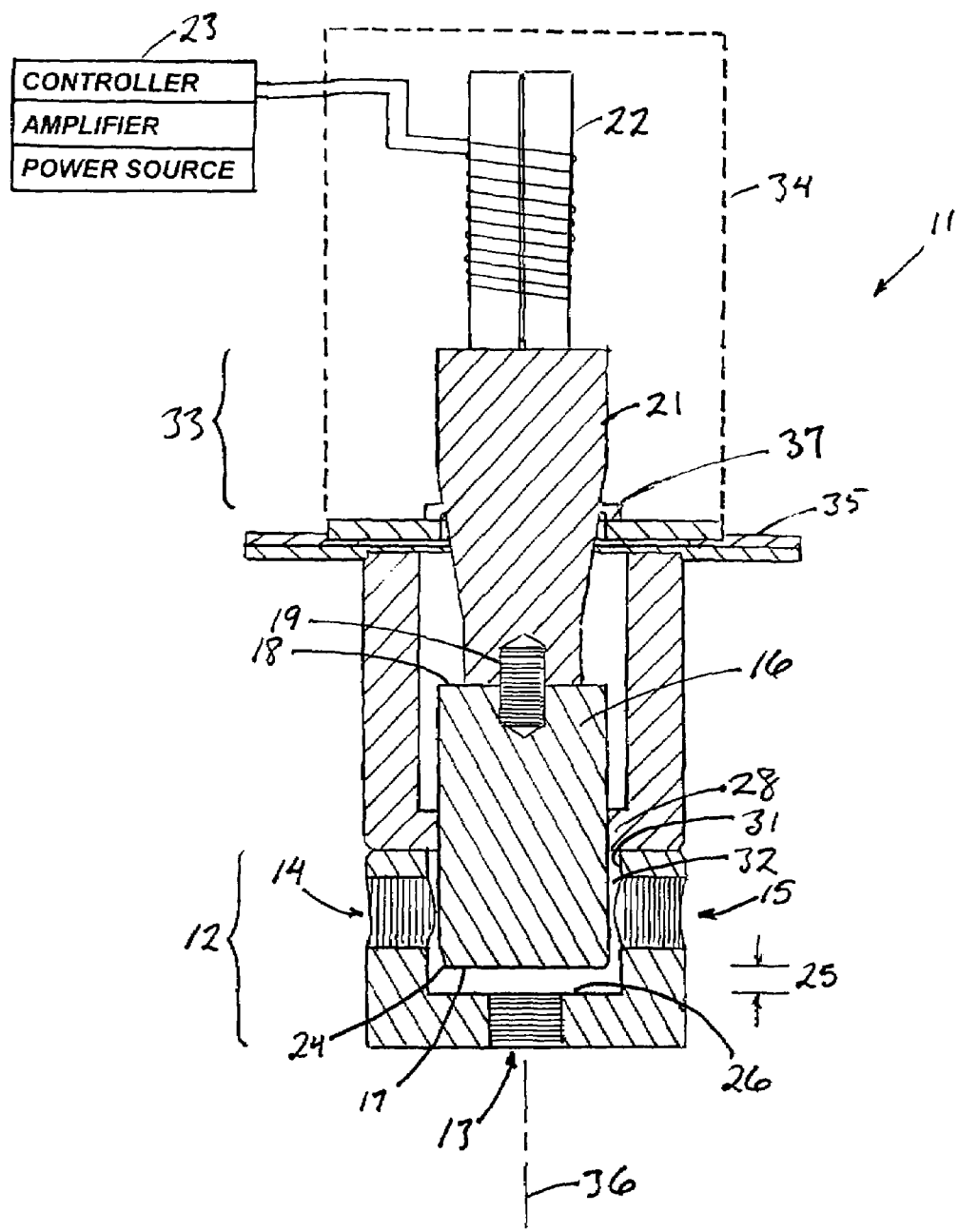
FIG. 1 is an axial cross section of an ultrasound reactor in accordance with the present invention.

While this invention is susceptible to a variety of implementations and configurations, a detailed study of a specific system within the scope of the invention will provide the reader with a full understanding of the concepts of the invention as a whole and how they can be applied. One such system is shown in the Figure.

FIG. 1 is an axial cross section of a continuous-flow reactor 11 in which a flowing reaction medium is exposed to ultrasound in accordance with this invention. The reactor consists of a reaction chamber 12 with an entry port 13 for the inflow of the reaction medium and exit ports, of which two 14, 15 are shown, through which the treated reaction medium leaves the chamber. Mounted to the reactor is an ultrasonic horn 16 whose distal end 17 extends into the interior of the reaction chamber 12. The proximal end 18 of the horn is joined by way of a coupling stud 19 to a connecting block 21 that in turn is joined to an ultrasonic transducer 22. The connecting block serves as vibration transmitter from the transducer to the horn 16, and as a waveguide and booster to increase the amplitude of the ultrasonic vibrations that are produced by the transducer 22. The transducer 22 is joined to an electrical power unit 23 which includes a power source, an amplifier, and a controller.

For best results, the material to be treated follows a flow path that sweeps across the surface of the distal end 17 of the ultrasonic horn, preferably the entire surface, with a continuous, constant flow and little or no dead volume. In the configuration shown in FIG. 1, this is achieved by using an ultrasonic horn with a flat (planar) distal end 17 and arranging the entry port 13 to direct the incoming flow to the center of the distal end surface, from which the flow proceeds radially outward to the peripheral rim 24 of the distal end and leaves the reaction chamber after having passed over the peripheral rim 24. The horn 16 is thus preferably cylindrical in shape with a circular distal end 17, and although the dimensions can vary within the scope of this invention, the distal end will preferably range in diameter from about 3 cm to about 30 cm, more preferably from about 5 cm to about 15 cm. The gap 25 between the floor 26 of the reaction chamber through which the incoming fluid enters and the distal end 17 of the horn can likewise vary, although for best results in most applications, the gap width is less than 3.0 cm, preferably less than 2.0 cm, and most preferably less than 1.5 cm. Preferably, the minimum gap width is 0.5 cm, and most preferably 1.0 cm. The surface-to-volume ratio, as defined above, is preferably about 0.5 cm$^{-1}$ or above and most preferably ranges from about 0.5 cm$^{-1}$ to about 5 cm$^{-1}$. In a presently preferred embodiment, the distal end is about 3.0 inches (7.6 cm) in diameter, and the gap is about 0.5 inch (1.3 cm).

To minimize the amount of dead volume in the reaction chamber 12, the chamber preferably encloses only the distal end 17 of the ultrasonic horn 16 and a portion of the length of the horn adjacent to the distal end, as shown in the Figure. The upper end of the chamber is thus closed off by a barrier 28 that is sealed around the sides of the horn. In addition, the reaction chamber 12 has an internal wall surface 31 that is complementary in shape to the portion of the ultrasonic horn 16 that extends into the chamber interior, with only a narrow lateral gap or clearance 32, and the exit ports 14, 15 are positioned only a small distance beyond the distal end 17 of the horn. In preferred constructions, this clearance 32 is less than 2.0 cm in width, more preferably less than 1.5 cm in width, and most preferably less than 1.0 cm in width.

While the ultrasonic transducer 22 is described in detail below, the transducer and the adjacent portion 33 of the connecting block 21 are surrounded by a cooling chamber 34 to limit the temperature rise resulting from the vibrations in the transducer and block. A flange 35 encircling the block serves as the floor of the cooling chamber. While the various components of system, including the reaction chamber 12, the ultrasonic horn 16, the connecting block 21, and the coolant chamber 34 are not limited to any particular shape, they are most conveniently and economically formed as bodies of revolution about a common axis 36.

The ultrasonic horn 16 in particular can be of any conventional shape and size that may be known in the prior art for ultrasonic horns. The horn may for example be cylindrical, preferably of circular cross section as indicated above, and suitable lengths may range from about 5 cm to about 100 cm, depending on the reactor size, and preferably from about 10 cm to about 50 cm, with a diameter of from about 3 cm to about 30 cm, and preferably from about 5 cm to about 15 cm. The block 21, which serves as both a mechanical connection that transmits the ultrasound vibrations from the transducer to the horn and an amplifier of the ultrasound waves by virtue of its tapering profile can likewise vary in its dimensions. With a block of the shape shown, a suitable length range is about 5 cm to about 100 cm, and most preferably from about 10 cm to about 50 cm, with its widest diameter preferably ranging from about 3 cm to about 30 cm, and preferably from about 5 cm to about 15 cm.

In preferred embodiments, the length of the block 21 is one-half the wavelength of the resonating frequency of the block. Furthermore, to minimize acoustical energy losses to the walls of the structure through the flange 35, the mounting fixture 37 on the block is positioned along the axis of the block at a distance equal to one-fourth the resonating frequency and thus the midpoint of the axial length of the block. As noted above, the block is preferably tapered as shown to provide a gain in acoustical amplitude from the transducer end to the end at which the horn 16 is mounted. This taper reduces the block diameter in the direction of the horn.

In a presently preferred construction, the horn 16 is about 13 cm in length and about 8 cm in diameter, and the block 21 is about 6 cm in length, about 8 cm in width in its widest portion, and about 5 cm in width at its narrower portion.

Metals from which the horn 16 and the block 21 can be made are well known in the art of ultrasound. Examples are steel, including stainless steel, tool steel, and other steels, as well as nickel, aluminum, titanium, copper, and various alloys of these metals. The block 21 is preferably made of steel, and the horn 16 is preferably made of aluminum or titanium. In a presently preferred construction, the block 21 is made of A2 tool steel and the horn 16 is made of aluminum.

The horn 16 or the block 21 or both can be clad with an ultrasound reflecting cladding to further reduce energy losses. In preferred embodiments of the invention, the block 21 is clad, with or without cladding of the horn 16 as well. Examples of materials that will serve as the ultrasound reflecting cladding are silver, gold, copper and aluminum. While certain metals are listed herein as suitable for both the body of the horn or block and the cladding, the metals serving as the body and the cladding will be different metals. Preferred among the metals for the cladding are silver and gold, with silver the most preferred. The cladding can be applied by any conventional method, of which electroplating and electroless plating are two examples.

The ultrasonic transducer can be of the configuration described in Gunnerman, R. W., et al., U.S. patent application Ser. No. 10/440,445, referenced above. To reiterate the description in that document, the transducer contains a stack of plates of a magnetic alloy that operates as a magnetostrictive material. The stack forms a pair of prongs that are wound with coils of electrical wire. The prongs can be joined by crossbars at both ends to form a closed loop. Each plate can thus be a rectangular plate with a central elongated opening. Any soft magnetic alloy is suitable for use as the plate material. Examples are iron-silicon alloys, iron-silicon-aluminum alloys, nickel-iron alloys, and iron-cobalt alloys, many of these containing additional alloying elements such as chromium, vanadium, and molybdenum. Examples of commercially available forms of these alloys are those sold under the trade names HIPERCO® 27, HIPERCO® 35, 2V PERMENDUR®, and SUPERMENDUR. A presently preferred alloy is HIPERCO® Alloy 50A (High Temp Metals, Inc., Sylmar, Calif., USA).

In a presently preferred method of fabricating the prongs, individual plates are cut from a sheet of the raw magnetic alloy material that is 0.017 inch (0.0067 cm) in thickness. Each plate is cut to a length equal to one-half the wavelength of the desired resonating frequency. Thus, for a resonating frequency of 17.5 kHz, for example, the preferred length of each plate is 5.125 inch (13.0 cm). The central elongated opening is cut large enough to permit the passage of electrical wire to form the coils on each side of the opening. In the preferred construction, the remaining portions of the plates around which the coils are wound are 3.6 inch (9.1 cm) in length and 0.83 inch (2.1 cm) in width, the opening being 0.73 inch (1.9 cm) in width.

The plates can be heat treated to maximize their performance as components of an ultrasound transducer. In a presently preferred method of treatment, the plates are heated in an inert atmosphere at a rate of 1,000 deg F./hour (556 deg C./hour) to 900° F. (482° C.), then at 400 deg F./hour (222) to 1,625° F. (885° C.), then soaked at this temperature for several hours (approximately three hours, 45 minutes), then cooled at 3.2 deg F./hour (1.7 deg C./hour) to 600° F. (316), and finally to room temperature. The plates are then bonded together to form a stack, which can contain as many as 96 plates. Once bonded, the plate stack is joined to the block by brazing with a silver brazing material.

The plate stack is then wound with electrical wire to form the coils and thereby complete the formation of the transducer. Separate coils are formed around each of the two prongs, in opposite directions so that when a voltage is applied across both windings the magnetic polarities arising from the resulting current are in opposite directions and magnetostrictive forces are created in a direction parallel to the axes of the prongs. For the specific construction referenced above, a suitable wire is 14 AWG MIL SPEC wire, and the coil contains 32 turns.

The transducer can be powered by any oscillating voltage. The oscillations can be a continuous waveform oscillation such as sinusoidal wave or a series of pulses such as rectangular waveform pulses. By "rectangular waveform" is meant a direct current voltage that alternates through stepwise voltage changes between a constant positive value and a baseline value. Rectangular waveforms that are preferred in the practice of this invention are those in which the baseline is a negative voltage rather than a zero voltage, and preferably those in which the alternating positive and negative voltages are of the same magnitude. Preferred voltage is from about 140 volts to about 300 volts, and preferably about 220 volts single-phase, and the preferred wattage is from about 1 kilowatt to about 10 kilowatts. The frequency of the voltage oscillation will be selected to achieve the desired ultrasound frequency. Preferred frequencies are in the range of about 10 to about 50 megahertz, with a range of about 15 to about 30 megahertz most preferred.

Aside from the particular ultrasound transducer described above and depicted in FIG. 1, ultrasonic vibrations in the horn 16 can be produced by a variety of methods known among those skilled in the use of ultrasound. Ultrasound consists of soundlike waves at a frequency above the range of normal human hearing, i.e., above 20 kHz (20,000 cycles per second). Ultrasonic energy has been generated with frequencies as high as 10 gigahertz (10,000,000,000 cycles per second), but for the purposes of this invention, useful results will be achieved with frequencies within the range of from about 30 kHz to about 300 MHz, and preferably within the range of from about 1 MHz to about 100 MHz. Ultrasonic waves can be generated from mechanical, electrical, electromagnetic, or thermal energy sources. While the intensity of the energy can vary widely, best results will generally be achieved with an intensity ranging from about 30 watts/cm$^2$ to about 300 watts/cm$^2$, or preferably from about 50 watts/cm$^2$ to about 100 watts/cm$^2$. An alternative to the magnetostrictive transducer as described above is a piezoelectric transducer, which uses natural or synthetic single crystals (such as quartz) or ceramics (such as barium titanate or lead zirconate) and applies an alternating electrical voltage across opposite faces of the crystal or ceramic to cause an alternating expansion and contraction of crystal or ceramic at the impressed frequency. Other methods known in the art can be used as well.

Any liquid reaction medium that will benefit from treatment by ultrasound can be processed in the reactor and by the methods of this invention. A reaction medium of particular interest is liquid fossil fuels, which term is used herein to denote any carbonaceous liquid that is derived from petroleum, coal, or any other naturally occurring material and that is used to generate energy for any kind of use, including industrial, agricultural, commercial, governmental, and consumer uses. Included among these fuels are automotive fuels such as gasoline, diesel fuel, jet fuel, and rocket fuel, and petroleum residuum-based fuel oils such as bunker fuels and residual fuels. Examples of bunker fuels are Nos. 4, 5, and 6 fuel oils, the latter also known as "Bunker C" fuel oil. The invention is also applicable to petroleum resids including vacuum resid, i.e., the heaviest fuel oil from the fractional distillation of petroleum, with a boiling point of 565° C. and above.

When the reaction medium is an oil, and particularly a fossil fuel, ultrasound in accordance with this invention is applied to an emulsion of the oil in an aqueous phase. Water or any aqueous solution can serve as the aqueous phase. The relative amounts of organic and aqueous phases may vary, and while the proportion may affect the efficiency of the process or the ease of handling the fluids, the relative amounts are not critical to this invention. In most cases, however, best results will be achieved when the aqueous phase constitutes from about 20% to about 75% of the emulsion, preferably from about 30% to about 50%.

A hydroperoxide can be included in the emulsion as an additive, but is not critical to the success of the conversion. The amount of hydroperoxide when present can vary. In most cases, best results will be achieved with a hydroperoxide concentration of from about 10 ppm to about 100 ppm by weight, and preferably from about 15 ppm to about 50 ppm by weight, of the aqueous phase, particularly when the hydroperoxide is $H_2O_2$. Alternatively, when the $H_2O_2$ amount is calculated as a component of the combined organic and aqueous phases, best results will generally be achieved in most systems with an $H_2O_2$ concentration within the range of from about 0.0003% to about 0.03% by volume (as $H_2O_2$), and preferably from about 0.001% to about 0.01%, of the combined phases. For hydroperoxides other than $H_2O_2$, the preferred concentrations will be those of equivalent molar amounts.

In certain embodiments of this invention, a surface active agent or other emulsion stabilizer is included to stabilize the emulsion as the organic and aqueous phases are being prepared for the ultrasound exposure. Certain petroleum fractions contain surface active agents as naturally-occurring components of the fractions, and these agents may be sufficient to stabilize the emulsion. In other cases, synthetic surface active agents or those that are not native to the petroleum can be added. Any of the wide variety of known materials that are effective as emulsion stabilizers can be used. These materials are listed in various references such as McCutcheon's Volume 1: Emulsifiers & Detergents—1999 North American Edition, McCutcheon's Division, MC Publishing Co., Glen Rock, N.J., USA, and other published literature. Cationic, anionic and nonionic surfactants can be used. Preferred cationic species are quaternary ammonium salts, quaternary phosphonium salts and crown ethers. Examples of quaternary ammonium salts are tetrabutyl ammonium bromide, tetrabutyl ammonium hydrogen sulfate, tributylmethyl ammonium chloride, benzyltrimethyl ammonium chloride, benzyltriethyl ammonium chloride, methyltricaprylyl ammonium chloride, dodecyltrimethyl ammonium bromide, tetraoctyl ammonium bromide, cetyltrimethyl ammonium chloride, and trimethyloctadecyl ammonium hydroxide. Quaternary ammonium halides are useful in many systems, and the most preferred are dodecyltrimethyl ammonium bromide and tetraoctyl ammonium bromide.

Surface active agents of particular interest are those that will promote the formation of an emulsion between the organic and aqueous phases upon passing the liquids through a common mixing pump, and yet allow the product mixture to separate spontaneously and readily into aqueous and organic phases upon leaving the reactor. Once settled, the phases can be separated by decantation or other conventional phase separation techniques. One class of surface active agents that will easily form an emulsion and yet separate readily upon leaving the reactor is liquid aliphatic $C_{15}$-$C_{20}$ hydrocarbons and mixtures of such hydrocarbons, preferably those having a specific gravity of at least about 0.82, and most preferably at least about 0.85. Examples of hydrocarbon mixtures that meet this description and are particularly convenient for use and readily available are mineral oils, preferably heavy or extra heavy mineral oil. These oils are readily available from commercial chemicals suppliers. The amount of mineral oil can vary and the optimal amount may depend on the grade of mineral oil, the composition of the material to be treated, the relative amounts of the aqueous and organic phases, and the operating conditions. Appropriate selection will be a matter of routine choice and adjustment by the skilled engineer. In the case of mineral oil, best and most efficient results will generally be obtained when the volume ratio of mineral oil to the organic phase is from about 0.00003 to about 0.003.

Another additive that is useful in forming and stabilizing the emulsion is a dialkyl ether. Preferred dialkyl ethers are those having a normal boiling point of at least 25° C. or whose molecular weight is at most about 100. Both cyclic and acyclic ethers can be used. Examples of preferred dialkyl ethers in the practice of this invention are diethyl ether, methyl tertiary-butyl ether, methyl-n-propyl ether, and methyl isopropyl ether. The most preferred is diethyl ether. The amount of the dialkyl ether can vary, although in most cases best results will be obtained when the volume ratio of ether to the oil phase is from about 0.00003 to about 0.003, and preferably from about 0.0001 to about 0.001.

Another optional component of the system is a metallic catalyst. Examples are transition metal catalysts, preferably metals having atomic numbers of 21 through 29, 39 through 47, and 57 through 79. Particularly preferred metals from this group are nickel, silver, tungsten (and tungstates), and combinations thereof. In certain systems within the scope of this invention, Fenton catalysts (ferrous salts) and metal ion catalysts in general such as iron (II), iron (III), copper (I), copper (II), chromium (III), chromium (VI), molybdenum, tungsten, and vanadium ions, are useful. Of these, iron (II), iron (III), copper (II), and tungsten catalysts are preferred. Tungstates include tungstic acid, substituted tungstic acids such as phosphotungstic acid, and metal tungstates. The metallic catalyst may be present as metal particles, pellets, screens, or any form that has high surface area and can be retained in the ultrasound chamber.

Further improvement in the efficiency of the process is often achievable by preheating the organic phase, the aqueous fluid, or both, prior to forming the emulsion or to exposing the emulsion to ultrasound. Preheating is preferably done to a temperature of from about 50° C. to about 100° C.

Other operating conditions in the ultrasound chamber can vary as well, depending on the material being treated and the throughput rate. The pH of the emulsion, for example, may range from as low as 1 to as high as 10, although best results are generally achieved within a pH range of 2 to 7. The pressure of the emulsion as it is exposed to ultrasound can likewise vary, ranging from subatmospheric (as low as 5 psia or 0.34 atmosphere) to as high as 3,000 psia (214 atmospheres), although preferably less than about 400 psia (27 atmospheres), and more preferably less than about 50 psia (3.4 atmospheres), and most preferably from about atmospheric pressure to about 50 psia.

An advantage of the present invention is that the process and equipment can treat fossil fuels, petroleum fractions, and other materials at a high throughput rate. Preferred throughput rates of the oil phase are from about 5 to about 500 gallons (U.S.) per minute (about 0.3 to about 30 L/sec), and most preferred are from about 8 to about 160 gallons (U.S.) per minute (about 0.5 to about 10 L/sec).

The foregoing is offered primarily for purposes of illustration. Further variations in the components of the apparatus and system, their arrangement, the materials used, the operating conditions, and other features disclosed herein that are still within the scope of the invention will be readily apparent to those skilled in the art.

What is claimed is:

1. A flow-through reactor for the continuous treatment of a liquid material with ultrasound, said flow-through reactor comprising:
    a reaction vessel,
    an elongate ultrasonic horn having first and second opposing end surfaces, said ultrasonic horn mounted to said reaction vessel with said first end surface extending into the interior of said reaction vessel,
    an electrical power source,
    an ultrasonic transducer operatively connecting said electrical power source to said second end surface of said ultrasonic horn to convert said electrical energy from said electrical power source to ultrasonic vibrations in said ultrasonic horn, and
    entry and exit ports in said reaction vessel arranged to cause liquid material entering said reaction vessel to strike said first end surface and flow across said first end surface before leaving said vessel through said exit port.

2. The flow-through reactor of claim 1 wherein said elongate ultrasonic horn further comprises a side surface joining said first and second end surfaces, said ultrasonic horn is mounted to said reaction vessel with said first end surface and at least a portion of said side surface extending into the interior of said reaction vessel, and said exit port is arranged to cause said liquid material to flow along said portion of said side surface before leaving said vessel through said exit port.

3. The flow-through reactor of claim 1 wherein said entry port is positioned less than 3.0 cm from said first end surface of said ultrasonic horn.

4. The flow-through reactor of claim 1 wherein said entry port is positioned less than 2.0 cm from said first end surface of said ultrasonic horn.

5. The flow-through reactor of claim 1 wherein said reaction vessel has an internal wall surface that is complementary in contour to side surface of said ultrasonic horn with a clearance of less than 2.0 cm between said internal wall surface and said side surface.

6. The flow-through reactor of claim 5 wherein said clearance is less than 1.5 cm.

7. The flow-through reactor of claim 5 wherein said clearance is less than 1.0 cm.

8. Apparatus for generating ultrasonic vibration, said apparatus comprising:
    an ultrasonic horn,
    an ultrasonic transducer arranged to receive electrical energy and to convert said electrical energy to ultrasonic vibrations, and
    a vibration transmitting block joining said ultrasonic transducer to said ultrasonic horn to transmit said ultrasonic vibrations from said ultrasonic transducer to said ultrasonic horn,
in which at least one of said ultrasonic horn and said vibration transmitting block is clad with an ultrasound reflecting cladding.

9. The apparatus of claim 8 wherein said vibration transmitting block is shaped to amplify said ultrasonic vibrations and is clad with an ultrasound reflecting cladding.

10. The apparatus of claim 8 wherein said vibration transmitting block is comprised of a first metal selected from the group consisting of steel, nickel, aluminum, titanium, copper, and alloys of nickel, aluminum, titanium and copper, and said cladding is comprised of a second metal different from said first metal and selected from the group consisting of silver, gold, copper and aluminum.

11. The apparatus of claim 8 wherein said cladding is on said vibration transmitting block and is silver.

12. The apparatus of claim 8 wherein said vibration transmitting block is comprised of steel and said cladding is a member selected from the group consisting of silver, gold, copper and aluminum.

13. The apparatus of claim 8 wherein said vibration transmitting block is comprised of steel and said cladding is a member selected from the group consisting of silver and gold.

14. The apparatus of claim 8 wherein said vibration transmitting block is comprised of steel and said cladding is silver.

15. A flow-through reactor for the continuous treatment of a liquid material with ultrasound, said flow-through reactor comprising:
a reaction vessel,
an elongate ultrasonic horn having first and second opposing end surfaces joined by a side surface, said ultrasonic horn mounted to said reaction vessel with said first end surface and at least a portion of said side surface extending into the interior of said reaction vessel,
an electrical power source,
an ultrasonic transducer operatively connecting said electrical power source to said second end surface of said ultrasonic horn to convert said electrical energy from said electrical power source to ultrasonic vibrations in said ultrasonic horn,
a vibration transmitting block joining said ultrasonic transducer to said ultrasonic horn to transmit said ultrasonic vibrations from said ultrasonic transducer to said ultrasonic horn, said vibration transmitting block clad with an ultrasound reflecting cladding, and
entry and exit ports in said reaction vessel arranged to cause liquid material entering said reaction vessel to strike said first end surface and flow across said first end surface before leaving said vessel through said exit port.

16. The flow-through reactor of claim 15 wherein said vibration transmitting block is comprised of steel and said cladding is a member selected from the group consisting of silver and gold.

17. The flow-through reactor of claim 15 wherein said cladding is on said vibration transmitting block and is silver.

18. The flow-through reactor of claim 15 wherein said vibration transmitting block is comprised of steel and said cladding is silver.

19. A process for treating a liquid fossil fuel by ultrasound, said process comprising continuously passing a fluid comprising said liquid fossil fuel and water through a reactor comprising:
a reaction vessel,
an elongate ultrasonic horn having first and second opposing end surfaces, said ultrasonic horn mounted to said reaction vessel with said first end surface extending into the interior of said reaction vessel, and
an ultrasonic transducer that converts electrical energy to ultrasonic vibrations, said ultrasonic transducer operatively connecting an electrical power source to said second end surface of said ultrasonic horn to transmit ultrasonic vibrations through said ultrasonic horn to said first end surface,
while supplying electrical energy to said ultrasonic transducer to produce said ultrasonic vibrations at said first end, and causing said fluid upon entering said reaction vessel to first strike said first end surface of said ultrasonic horn in a direction substantially normal to said first end surface and then to flow across said first end surface.

20. The process of claim 19 further comprising feeding said fluid to said reaction vessel through an entry port in said reaction vessel that is positioned less than 3.0 cm from said first end surface of said ultrasonic horn.

21. The process of claim 19 further comprising feeding said fluid to said reaction vessel through an entry port in said reaction vessel that is positioned less than 2.0 cm from said first end surface of said ultrasonic horn.

22. The process of claim 19 further comprising feeding said fluid to said reaction vessel through an entry port in said reaction vessel that is positioned less than 1.5 cm from said first end surface of said ultrasonic horn.

23. The process of claim 19 comprising continuously passing said fluid through said reactor at a rate that includes a fossil fuel flow rate of from about 0.3 to about 30 L/sec.

24. The process of claim 19 comprising continuously passing said fluid through said reactor at a rate that includes a fossil fuel flow rate of from about 0.5 to about 10 L/sec.

25. The process of claim 19 further comprising feeding said fluid to said reaction vessel through an entry port in said reaction vessel that is positioned less than 1.5 cm from said first end surface of said ultrasonic horn, at a rate that includes a fossil fuel flow rate of from about 0.5 to about 10 L/sec.

26. The process of claim 19 wherein said fluid is an emulsion consisting of an aqueous phase and an organic phase in which said aqueous phase constitutes from about 20% to about 75% by volume of said emulsion.

27. The process of claim 19 wherein said fluid is an emulsion consisting of an aqueous phase and an organic phase in which said aqueous phase constitutes from about 30% to about 50% by volume of said emulsion.

28. The process of claim 19 wherein said electrical energy is at a wattage of from about 1 to about 10 kilowatts.

29. The process of claim 19 wherein said electrical energy is in the form of a pulsewise voltage at a frequency of from about 10 to about 50 megahertz and a wattage of about 1 to about 10 kilowatts.

30. The process of claim 19 wherein said ultrasonic transducer is operatively connected to said ultrasonic horn through a vibration transmitting block that is clad with an ultrasound reflecting cladding.

31. The process of claim 30 wherein said vibration transmitting block is comprised of a first metal selected from the group consisting of steel, nickel, aluminum, titanium, copper, and alloys of nickel, aluminum, titanium, and copper, and said cladding is comprised of a second metal different from said first metal and selected from the group consisting of silver, gold, copper and aluminum.

32. The process of claim 30 wherein said vibration transmitting block is comprised of steel and said cladding is a member selected from the group consisting of solver, gold, copper and aluminum.

33. The process of claim 30 wherein said vibration transmitting block is comprised of steel and said cladding is silver.

* * * * *